(12) United States Patent
Semcken

(10) Patent No.: US 11,716,519 B2
(45) Date of Patent: Aug. 1, 2023

(54) MONITORING SEGMENTATION MESSAGES OF VIDEO STREAMS

(71) Applicant: AMC Network Entertainment LLC, New York, NY (US)

(72) Inventor: Adam Frederick Semcken, West Islip, NY (US)

(73) Assignee: AMC Network Entertainment LLC, New York, NY (US)

( * ) Notice: Subject to any disclaimer, the term of this patent is extended or adjusted under 35 U.S.C. 154(b) by 0 days.

(21) Appl. No.: 17/677,615

(22) Filed: Feb. 22, 2022

(65) Prior Publication Data

US 2022/0182736 A1 Jun. 9, 2022

Related U.S. Application Data

(63) Continuation of application No. 16/541,880, filed on Aug. 15, 2019, now Pat. No. 11,259,098.

(51) Int. Cl.
| | | |
|---|---|---|
| *H04N 21/00* | (2011.01) | |
| *H04N 21/40* | (2011.01) | |
| *H04N 21/845* | (2011.01) | |
| *H04N 21/81* | (2011.01) | |
| *H04N 21/431* | (2011.01) | |
| *H04N 21/43* | (2011.01) | |
| *H04N 21/80* | (2011.01) | |

(52) U.S. Cl.
CPC ..... *H04N 21/8456* (2013.01); *H04N 21/4316* (2013.01); *H04N 21/8146* (2013.01); *H04N 21/8166* (2013.01)

(58) Field of Classification Search
USPC ....... 386/239, 248, 314, 326; 725/32, 33, 34
See application file for complete search history.

(56) References Cited

U.S. PATENT DOCUMENTS

| | | |
|---|---|---|
| 7,613,803 B2 | 11/2009 | Pioso |
| 8,855,470 B2 | 10/2014 | Stern et al. |
| 9,936,184 B2 | 4/2018 | Kaiser et al. |
| 9,942,590 B2 | 4/2018 | Carlucci et al. |

(Continued)

FOREIGN PATENT DOCUMENTS

WO 2018/028986 A1 2/2018

OTHER PUBLICATIONS

Levy, T. (Mar. 16, 2017). "Advantages and Challenges of a Vast Server-Side Video Advertising Solution," located at https://www.ibc.org/tech-advances/advantages-and-challenges-of-a-vast-server-side-video-advertising-solution/900, visited on May 25, 2018. (8 pages).

(Continued)

*Primary Examiner* — Daquan Zhao
(74) *Attorney, Agent, or Firm* — Morrison & Foerster LLP

(57) ABSTRACT

Described are method and system embodiments for monitoring segmentation messages of a digital video stream. In some embodiments, a method is performed at an electronic device with a display and operated by a user. The method includes monitoring the digital video stream for segmentation messages and detecting a segmentation message in the digital video stream. Then, a validity of the detected segmentation message is determined based on a previously-detected segmentation message. The user is notified of the determined validity of the segmentation message using the display.

16 Claims, 10 Drawing Sheets

(56) References Cited

U.S. PATENT DOCUMENTS

| | | | |
|---|---|---|---|
| 2004/0010807 A1* | 1/2004 | Urdang | H04N 5/782 |
| | | | 348/E7.071 |
| 2013/0086178 A1 | 4/2013 | Osborne et al. | |
| 2016/0227281 A1 | 8/2016 | Abuelsaad et al. | |
| 2017/0032692 A1 | 2/2017 | Choi et al. | |

OTHER PUBLICATIONS

Semcken, U.S. Office Action dated Jul. 17, 2020, directed to U.S. Appl. No. 16/541,880; 12 pages.

Semcken, U.S. Office Action dated May 5, 2021 directed to U.S. Appl. No. 16/541,880; 14 pages.

Semcken, U.S. Office Action dated Oct. 27, 2020, directed to U.S. Appl. No. 16/541,880; 13 pages.

* cited by examiner

MONITORING SEGMENTATION MESSAGES OF VIDEO STREAMS

CROSS REFERENCE TO RELATED APPLICATIONS

This application is a continuation of U.S. application Ser. No. 16/541,880, filed Aug. 15, 2019, the entire contents of each of which are incorporated herein by reference.

FIELD OF THE DISCLOSURE

The present disclosure relates generally to systems and methods for monitoring segmentation messages of a digital video stream.

BACKGROUND OF THE INVENTION

Television (TV) has been and remains an important medium for providing a large population of people with content related to entertainment, education, news, politics, and advertising. In the TV industry, a TV programming originator broadcasts digital video streams to network affiliates (also referred to as affiliated stations), which distributes the digital video streams to viewers in geographical regions served by the network affiliates. The broadcasted digital video stream can include programming content and advertising content as well as segmentation messages that delimit the content types within the broadcasted video streams. For example, such segmentation messages may be Society of Cable Telecommunications Engineers (SCTE) 35 messages that conform with the SCTE-35 (ANSI/SCTE 35) standard describing the inline insertion of cue tones in digital video streams complying with the MPEG transport stream (MPEG-TS) format.

By including these segmentation messages, a network affiliate may be enabled to replace certain advertising content with spliced, local content more relevant to viewers served by the network affiliate. If the TV programming originator were to incorrectly insert the segmentation messages into the digital video streams (e.g., an out-of-order or a missing SCTE 35 message), the network affiliate may be unable to splice local content or splice content at the wrong times within the digital video stream and disrupt portions of programming content within the digital video stream. In each scenario, the viewing experience provided to the viewers of the digital video streams will be degraded.

BRIEF SUMMARY OF THE INVENTION

In some embodiments, the broadcasted digital video streams are typically in a compressed digital video format. To generate these compressed digital video streams for broadcast, the TV programming originator can include an automation system and an encoding system. The automation system can insert segmentation messages into an uncompressed digital video stream including programming content and advertising content. In some embodiments, these segmentation messages are SCTE 104 messages that conform with the SCTE 104 (ANSI/SCTE 104) standard. The encoding system can encode the uncompressed digital video stream to include SCTE 35 messages based on the SCTE 104 messages to generate a compressed video stream for broadcast and including segmentation messages that are encoded. If the SCTE 104 messages are incorrectly inserted into the uncompressed digital video stream, however, the SCTE 35 encoded segmentation message inserted by the encoding system into the compressed video stream will also be incorrect. Accordingly, segmentation-message monitoring tools are needed to monitor segmentation messages (e.g., SCTE-104 messages) within a digital video stream.

Most current monitoring tools, however, only generate logs of detected segmentation messages that may be accessed and viewed by an operator at the TV programming originator facility. These logs do not notify the user as to whether any detected segmentation message is valid. Moreover, these logs are text based and do not provide an efficient user interface to allow the operator to quickly determine whether inserted segmentation messages are valid. Often, these logs are not used proactively to timely remedy any detected errors of inserted segmentation messages. Instead, these logs are used reactively by the operator to determine errors in transmitted video stream in response to receiving complaints from network affiliates. Some current monitoring tools provide text-based messages to the operator to notify the operator of segmentation messages detected in the monitored video stream. These tools, however, not only do not indicate whether a detected segmentation message is valid, but also still provide only text-based interfaces that do not enable the operator to determine in real time whether segmentation messages detected in the digital video stream are valid.

There is a need, therefore, for methods, systems, and techniques for improved monitoring of segmentation messages of the digital video stream. In some embodiments, a method for monitoring segmentation messages of a digital video stream includes: at an electronic device with a display to display segmentation messages of a digital video stream: monitoring a digital video stream comprising segmentation messages; storing a sequence of segmentation messages previously detected in the digital video stream; displaying to a user of the electronic device the previously-detected segmentation messages as corresponding graphical objects on a graphical representation of the digital video stream; while displaying the previously-detected segmentation messages, detecting a segmentation message of the digital video stream; determining a validity of the detected segmentation message based on the stored sequence of segmentation messages; and displaying an indication in the graphical representation of the video stream to notify the user of the determined validity of the detected segmentation message, wherein the indication is displayed in relation to a displayed graphical object corresponding to the detected segmentation message.

In some embodiments, a method for monitoring segmentation messages of a digital video stream, comprises: at an electronic device with a display and operated by a user: monitoring a digital video stream for segmentation messages; detecting a segmentation message in the monitored digital video stream; determining a validity of the segmentation message based on a previously-detected segmentation message; and notifying the user of the determined validity of the segmentation message using the display.

In some embodiments, the method comprises storing in a log a sequence of segmentation messages previously detected in the digital video stream.

In some embodiments, the method comprises displaying the previously-detected segmentation messages on the display as corresponding graphical objects on a graphical representation of the digital video stream.

In some embodiments, notifying the user comprises: displaying an indication in a graphical representation of the digital video stream to notify the user of the determined validity of the detected segmentation message, wherein the indication is displayed in relation to a displayed graphical object corresponding to the detected segmentation message.

In some embodiments, the indication comprises a predefined color or text in the displayed graphical object.

In some embodiments, displaying the indication in the graphical representation comprises: in response to determining that the detected segmentation message is invalid, displaying the indication to notify the user that the detected segmentation message is out of sequence.

In some embodiments, displaying the indication in the graphical representation comprises: in response to determining that the segmentation message is invalid, displaying on the display a valid segmentation message generated based on the previously-detected segmentation message; and requesting the user to actuate the valid segmentation message.

In some embodiments, in response to receiving a request from the user to actuate the valid segmentation message, the method comprises causing the valid segmentation message to be inserted into the digital video stream.

In some embodiments, the method comprises determining one or more segmentation messages expected to follow the detected segmentation message based on data of the detected segmentation message; and displaying the one or more expected segmentation messages as one or more corresponding graphical objects on the graphical representation of the video stream.

In some embodiments, the segmentation message is detected while the previously-detected segmentation messages are displayed on the display.

In some embodiments, the sequence includes the previously-detected segmentation message, and wherein the validity of the segmentation message is determined based on a type of the segmentation message and the previously-detected segmentation message.

In some embodiments, determining the validity of the segmentation message comprises: determining whether the type of the segmentation message is valid based on one or more permitted message sequences associated with the previously-detected segmentation message.

In some embodiments, the one or more permitted message sequences comprises one or more plurality of pairs of permitted segmentation message types.

In some embodiments, monitoring the digital video stream for segmentation messages comprises: receiving a portion of the digital video stream; and extracting metadata associated with the portion to detect the segmentation message.

In some embodiments, the portion comprises a video frame of the digital video stream.

In some embodiments, extracting the metadata comprises: parsing a Vertical Ancillary (VANC) space or a Horizontal Ancillary (HANC) space of the portion of the digital video stream.

In some embodiments, the detected segmentation message comprises a predefined marker that delimits a start or an end of a type of video content present in or to be multiplexed to the digital video stream.

In some embodiments, the plurality of segmentation messages comprises Society of Cable Telecommunications Engineers (SCTE) 104 messages.

In some embodiments, the plurality of segmentation messages comprises SCTE-35 messages.

In some embodiments, a system for monitoring segmentation messages of a digital video stream comprises: a display for displaying segmentation messages of a digital video stream; one or more processors; and memory storing one or more programs that when executed by the one or more processors cause the one or more processors to: monitor the digital video stream for segmentation messages; detect a segmentation message in the monitored digital video stream; determine a validity of the segmentation message based on a previously-detected segmentation message; and notify the user of the determined validity of the segmentation message using the display.

In some embodiments, the one or more processors are caused to: store in a log a sequence of segmentation messages previously detected in the digital video stream.

In some embodiments, the one or more processors are caused to: display the previously-detected segmentation messages on the display as corresponding graphical objects on a graphical representation of the digital video stream; and display an indication in the graphical representation to notify the user of the determined validity of the detected segmentation message, wherein the indication is displayed in relation to a displayed graphical object corresponding to the detected segmentation message.

In some embodiments, the indication comprises a predefined color or text in the displayed graphical object.

In some embodiments, the one or more processors are caused to: in response to determining that the segmentation message is invalid, display on the display a valid segmentation message generated based on the previously-detected segmentation message; and request the user to actuate the valid segmentation message.

In some embodiments, the one or more processors are caused to: in response to receiving a request from the user to actuate the valid segmentation message, cause the valid segmentation message to be inserted into the digital video stream.

In some embodiments, a non-transitory computer-readable storage medium storing one or more programs is configured to be executed by one or more processors of a device with one or more processors and memory, and the one or more programs includes instructions for: monitoring a digital video stream for segmentation messages; detecting a segmentation message in the monitored digital video stream; determining a validity of the segmentation message based on a previously-detected segmentation message; and notifying the user of the determined validity of the segmentation message using the display.

Further embodiments, features, and advantages, as well as the structure and operation of the various embodiments, are described in detail below with reference to accompanying drawings.

BRIEF DESCRIPTION OF THE DRAWINGS

The foregoing summary, as well as the following detailed description of embodiments, is better understood when read in conjunction with the appended drawings. For the purpose of illustrating the present disclosure, the drawings show example embodiments of the disclosure; the disclosure, however, is not limited to the specific methods and instrumentalities disclosed. In the drawings.

DETAILED DESCRIPTION OF THE INVENTION

Described below are systems, methods, apparatuses, and computer program product embodiments for monitoring segmentation messages of a digital video stream. Problems solved by embodiments disclosed herein can include providing a graphical user interface to allow operators to more quickly determine whether detected segmentation messages are valid. By doing so, operators can more timely respond to segmentation message errors in the digital video stream.

Figure 1A:
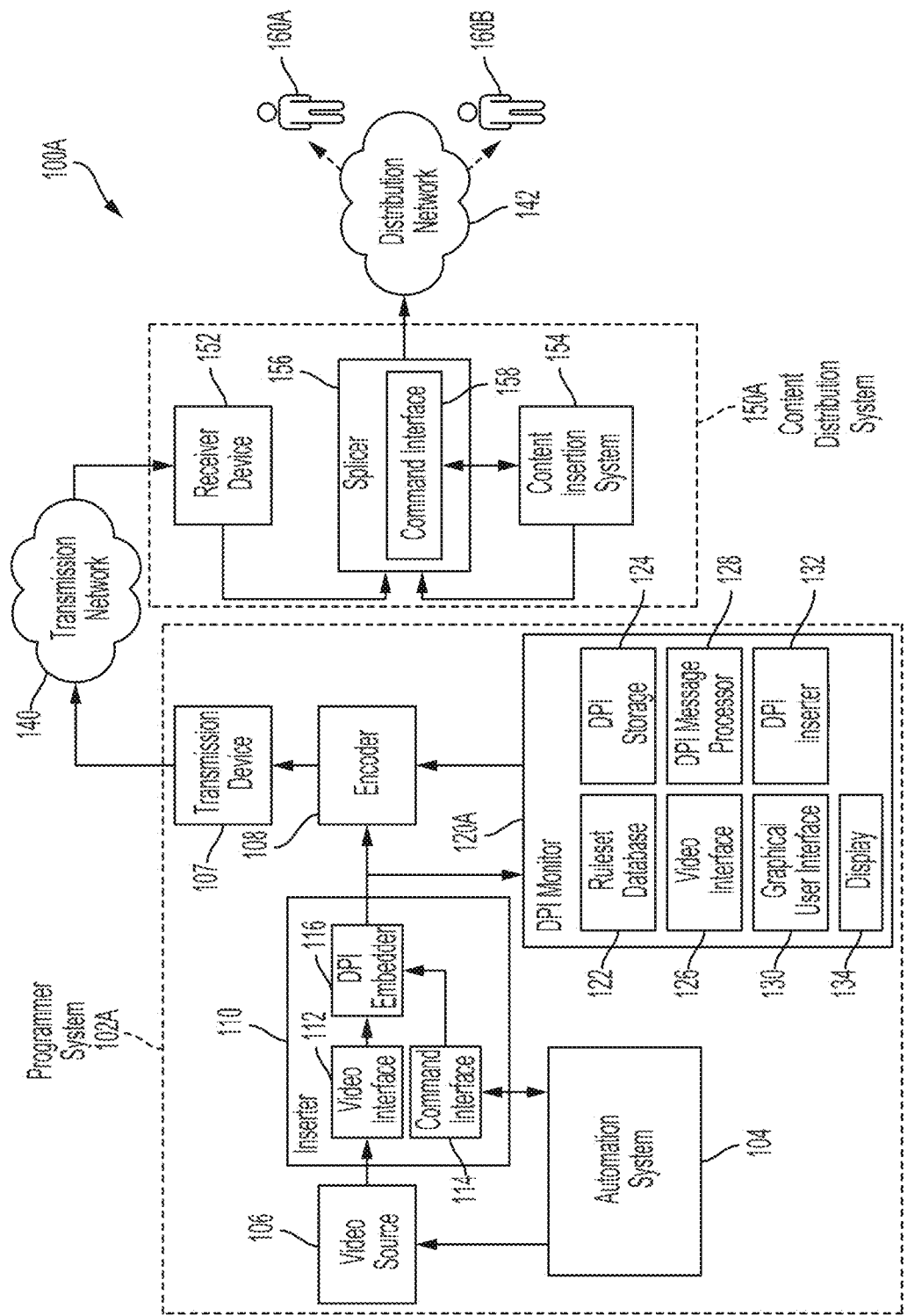
FIGS. 1A-B illustrate systems for monitoring segmentation messages of a digital video stream, according to some embodiments.
Figure 1B:
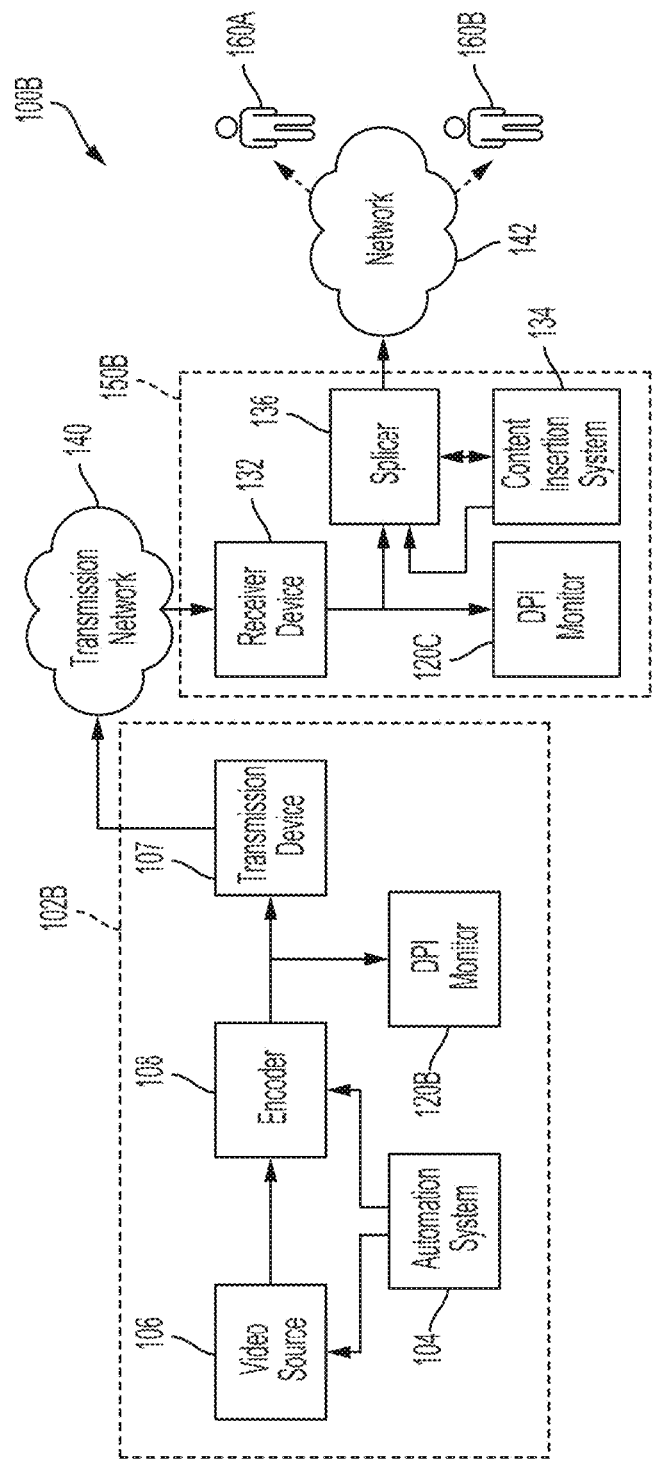

FIGS. 1A-B illustrate systems 100A-B for monitoring segmentation messages of a digital video stream, according to some embodiments. In FIG. 1A, system 100A includes a programmer system 102A that transmits a digital video stream to content distribution system 150A through transmission network 140. In the context of TV broadcasts, programmer system 102A may be operated by a TV programming originator (e.g., a TV network) and content distribution system 150A may correspond to network affiliates such as a local TV station that serves content viewers 160A-B in a specific geographic region. As will be further described below, content distribution system 150A may process the received digital video stream for distribution to content viewers 160A-B through distribution network 142.

In some embodiments, to broadcast the digital video streams to content distribution system 150A, programmer system 102A can be configured to include automation system 104, video source 106, inserter 110, encoder 108, and transmission device 107. In some embodiments, video source 106 provides a baseband video stream to inserter 110. The baseband video stream may be an uncompressed digital video stream that includes one or more segments of programming content. In some embodiments, the baseband video stream can also include one or more segments of advertising content.

In some embodiments, automation system 104 can be configured to control playout of baseband video streams from video source 106 and request inserter 110 to embed segmentation messages to delimit one or more segments within the baseband video streams. For example, a segmentation message may include information specifying a location for a segment of advertising content within the digital video stream. For example, the location may include a beginning time or an end time with respect to the digital video stream. In some embodiments, automation system 104 can be configured to communicate with command interface 114 of inserter 110 using General Purpose Interface (GPI) triggers or a TCP/IP connection to provide the requests. In some embodiments, the request from automation system 104 can include information used by inserter 110 to generate a specific segmentation message. In some embodiments, the information includes the generated segmentation message.

In some embodiments, inserter 110 can be configured to embed segmentation messages into the baseband video stream to specify or delimit one or more segments within the digital video stream. As discussed above, the segmentation messages may be SCTE 104 messages that conform to the ANSI/SCTE 104 standard. In some embodiments, to embed these segmentation messages, inserter 110 can be configured to include video interface 112, command interface 114, and digital program insertion (DPI) embedder 116. Video interface 112 may be configured to receive the baseband video stream from video source 106. In some embodiments, video interface 112 can continuously receive portions of the baseband video stream. For example, video interface 112 may receive sequential video frames of the baseband video stream. In some embodiments, command interface 114 can be configured to communicate with automation system 104 to receive requests to embed specific segmentation messages in specified portions of the baseband video stream. Based on the requests, command interface 114 may generate a segmentation message to be embedded.

In some embodiments, DPI embedder 116 can be configured to receive a portion of the baseband video stream from video interface 112 and embed a segmentation message generated by command interface 114 into that portion. In some embodiments, DPI embedder 116 can be configured to multiplex the portion of the baseband video stream (e.g., a portion of an SDI video stream) with the segmentation message (e.g., a SCTE-104 message). In some embodiments, DPI embedder 116 can be configured to insert the generated segmentation message into the vertical ancillary (VANC) data space of the baseband video. For example, DPI embedder 116 may embed a SCTE-104 segmentation message in the VANC space of one or more video frames of the baseband video stream. In some embodiments, DPI embedder 116 can be configured to insert the generated segmentation message into the horizontal ancillary (HANC) data space of the baseband video stream. In some embodiments, the output of inserter 110 can be a serial digital interface (SD) video stream. In some embodiments, SDI-based video stream comprises uncompressed, unencrypted digital video signals. In some embodiments, the SDI video stream comprises embedded audio and time code.

In some embodiments, encoder 108 can be configured to encode the digital video stream from inserter 110 into a video transport stream having a compressed digital video stream format for transmission to content distribution system 150A. In some embodiments, encoder 108 can be configured to format the digital video stream into an MPEG transport stream (TS) format. In some embodiments, the video transport stream includes one or more video streams that comport with the following standards: MPEG-4, MPEG-2, H.264 (i.e., MPEG-4 Part 10 or AVC (for Advanced Video Coding)). For example, encoder 108 may perform compression to generate an MPEG-2 or MPEG-4 digital video data stream.

In some embodiments, the encoding process includes encoding the segmentation messages into encoded segmentation messages. In some embodiments, the encoding process includes translating the segmentation messages into compressed stream markers for transmission with encoded (e.g., compressed) content. In some embodiments, the compressed stream markers conform with SCTE-35. Accordingly, encoder 108 can be configured to process the SCTE-104 segmentation messages to generate SCTE-35 segmentation messages corresponding to the encoded segmentation messages. In some embodiments, the SCT-35 segmentation messages are embedded inside the video transport stream (e.g., the MPEG Transport Stream) and contain PCR timing data. In some embodiments, encoder 108 can be configured to compress and encode the SDI digital video stream generated by inserter 110 to generate a video transport stream of compressed content. In some embodiment, encoder 108 can implement discrete cosine transform (DCT) blocks to perform the compression, as is well known by a person of ordinary skill in the art.

In some embodiments, encoder 108 provides the video transport stream (e.g., MPEG-TS) to transmission device 107 configured to distribute the video transport stream to content distribution system 150A. In some embodiments, transmission device 107 can be a satellite dish and transmission network 140 can be a satellite network. In other embodiments, transmission device 107 may be a network device such as a router and transmission network 140 may be an IP-based communications network.

In some embodiments, programmer system 102A includes DPI monitor 120A configured to monitor a digital video stream provided by inserter 110. As discussed above, the digital video stream may include segmentation messages (e.g., SCTE-104 messages) that specify and delimit content segments within the digital video stream such as whether a specific content segment is a programming segment or an advertisement segment as well as when the specific content segments starts or stops. In some embodiments, DPI monitor 120A can be an electronic device that includes a display 134 and implements one or more of the following components: ruleset database 122, DPI storage 124, video interface 126, DPI message processor 128, graphical user interface (GUI) 130, and DPI inserter 132.

In some embodiments, ruleset database 122 can be configured to store a plurality of permitted segmentation message sequences. In some embodiments, each permitted sequence can include a pair of segmentation-message types. In some embodiments, ruleset database 122 can be configured to organize the plurality of permitted segmentation message sequences based on a type of each segmentation message. In some embodiments, ruleset database 122 can store a plurality of segmentation-message types and one or more permitted segmentation messages associated with each segmentation-message type. The one or more permitted segmentation messages may include segmentation messages that may immediately follow a segmentation message of that type. For example, for a first segmentation message of type "CHAPTER_START," the one or more permitted segmentation messages may include a segmentation message of type "CHAPTER_END." Any other types of segmentation messages that follow the first segmentation message and that are not any of the permitted segmentation messages may be detected to be an invalid segmentation message.

In some embodiments, ruleset database 122 can store user configurations associated with one or more types of segmentation messages. In some embodiments, a user configuration for a type of segmentation messages may indicate one or more segmentation messages that are expected to be received at a subsequent time. For example, for a segmentation message having a type of "BREAK_START" indicating a start for advertisement content, the user configuration may indicate at least one provider ad is to be received before the break time ends. For example, the user configuration may include an ordered sequence of at least three segmentation message types: "PROVIDER_AD_START," "PROVIDER_AD_END," and "BREAK_END."

In some embodiments, video interface 126 receives the digital video stream provided by inserter 110. For example, video interface 126 may continuously receive portions (e.g., frames) of the digital video stream.

In some embodiments, DPI message processor 128 can be configured to extract metadata from the received digital video stream. In some embodiments, to extract the metadata, DPI message processor 128 can be configured to demux VANC data or HANC data from each portion of the digital video stream. In some embodiments, DPI message processor 128 can parse the extracted metadata to determine a presence of a segmentation message. In some embodiments, upon detecting the segmentation message, DPI message processor 128 can be configured to store the detected segmentation message in a log in DPI storage 124. In some embodiments, the log may be configured to store a sequence of detected segmentation messages of the digital video stream. In some embodiments, DPI message processor 128 can determine a message is a segmentation message based on a message ID parsed from the message. For example, a message including an ID of 0x0104 may be determined to be a segmentation message. In some embodiments, segmentation messages can include splice messages related to splicing local content (e.g., advertisement content) into the digital video streams. In these embodiments, a message including an ID of 0x0101 may be a splice message and determined to be a segmentation message.

In some embodiments, DPI message processor 128 can be configured to determine a type of the detected segmentation message based on a type identifier (ID) within the segmentation message. In some embodiments, DPI message processor 128 can determine the type of the detected segmentation message by comparing the type ID against a table of predefined segmentation IDs. For example, the following table depicts different types of segmentation messages.

| TYPE ID | SEGMENTATION TYPE |
| --- | --- |
| 0x10h | PROGRAM_START |
| 0x11h | PROGRAM_END |
| 0x20h | CHAPTER_START |
| 0x21h | CHAPTER_END |
| 0x22h | BREAK_START |
| 0x23h | BREAK_END |
| 0x30h | PROVIDER_ADVERTISEMENT_START |
| 0x31h | PROVIDER_ADVERTISEMENT_END |
| 0x32h | DISTRIBUTOR_ADVERTISEMENT_START |
| 0x33h | DISTRIBUTOR_ADVERTISEMENT_END |
| 0x34h | PLACEMENT_OPPORTUNITY_START |
| 0x35h | PLACEMENT_OPPORTUNITY_END |

In some embodiments, DPI message processor 128 can be configured to provide to the user one or more predicted segmentation messages and associated times based on the information in the detected segmentation message such as the type ID. In some embodiments, ruleset database 122 can be configured to define whether one or more predicted segmentation messages are associated with each segmentation type ID.

In some embodiments, DPI message processor 128 can be configured to determine a validity of the detected segmentation message based on the type of the segmentation message and a log of DPI storage 124 and storing any previously-detected segmentation messages of the digital video stream. In some embodiments, DPI message processor 128 can be configured to retrieve one or more permitted segmentation message types based on a previously-detected segmentation message in the log. Then, to determine the validity of the detected segmentation message, DPI message processor 128 can compare the type of the detected segmentation message against the one or more permitted segmentation message types. In some embodiments, if the detected segmentation message type does not match any of the one or more permitted segmentation message types, DPI message processor 128 can determine that the detected segmentation message is invalid. In some embodiments, DPI message processor 128 can notify the user of the determined validity via display 134.

In some embodiments, DPI inserter 132 can be configured to enable the user to remedy a first segmentation message that is determined to be invalid. In some embodiments, DPI inserter 132 can be configured to automatically generate and display to the user a second segmentation message to remedy the first segmentation message. In some embodiments, the generated second segmentation message may be a predicted segmentation message previously generated by DPI message processor 128, as described above. In some embodiments, DPI inserter 132 can request encoder 108 to embed the second segmentation message. In other embodiments, DPI inserter 132 can be configured to request automation system 104 to instruct inserter 110 to insert the second segmentation message.

In some embodiments, GUI 130 can be configured to enable the user to visually monitor the segmentation messages detected in the digital video stream. In some embodiments, GUI 130 can be configured to display on display 134 a graphical representation of the received digital video stream. To enable the user to efficient monitor segmentation messages, GUI 130 can be configured to display one or more graphical objects on the graphical representation to represent one or more corresponding segmentation messages associated with the digital video stream. In some embodiments, the sequence and the location of the one or more graphical objects with respect to the graphical representation is determined based on a sequence of the one or more segmentation messages associated with the digital video stream. For example, the graphical representation may be a circular graphic and each graphical object may be displayed as a ring segment of the circular graphic, as will be further described below with respect to FIGS. 4A-E. In another example, the graphical representation may be a rectangular graphic representative of a timeline and each graphical object may be displayed as a rectangle segment of the rectangular graphic. A location of a displayed graphical object may indicate an order of a corresponding segmentation message with respect to other segmentation messages detected from the digital video stream.

In some embodiments, as discussed above, content distribution system 150A can be configured to process digital video streams received from programmer system 102A to be distributed to content viewers 160A-B through distribution network 142. In some embodiments, to process these received digital video streams, content distribution system 150A can implement one or more of the following components: receiver device 152, content insertion system 154, and splicer 156.

In some embodiments, receiver device 152 receives and recovers the video transport stream from transmission network 140. For example, when transmission network 140 is a satellite network, receiver device 152 may include a digital Integrated Receiver-Decoder (IRD) that receives and decodes the video transport stream from a satellite dish. In another example, when transmission network 140 is an IP-based network, receiver device 152 may be a router or a gateway configured to receive the video transport stream from the IP-based network.

In some embodiments, splicer 156 can be configured to process the video transport stream to splice in other content based on the segmentation messages (e.g., SCTE-35 messages) detected within the video transport stream. As discussed above, each segmentation message may specify a type of a video segment as well as the boundaries (e.g., a start time and an end time) of that video segment. In some embodiments, command interface 158 of splicer 156 can be configured to communicate with content insertion system 154 to replace one or more segments of the video transport stream based on the detected segmentation messages.

In some embodiments, content insertion system 154 can be configured to provide other content such as advertising content to splicer 156. Content insertion system 154 can also be configured to communicate with splicer 156 to control the timing and which advertising contents are to replace segments of the video transport stream. In some embodiments, content insertion system 154 communicates with command interface 158 based on the SCTE-30 standard.

In some embodiments, splicer 156 generates an output digital video stream for distribution to content viewers 160A-B through distribution network 142. In some embodiments, distribution network 142 may include a hybrid fiber-coaxial (HFC) network that distributes the output digital video stream to set-top boxes of corresponding content viewers 160A-B. Often, these set-top boxes are connected to a TV display to enable content viewers 160A-B to view the digital video stream. In some embodiments, distribution network 142 may include an IPTV network. In these embodiments, content viewers 160A-B can access the digital video stream using an IP-enabled device such as a network-enabled TV (i.e., a smart TV), a mobile device, or a personal computer, etc.

FIG. 1B illustrates a system 100B for monitoring segmentation messages of a digital video stream, according to some embodiments. Like system 100A as described above with respect to FIG. 1A, system 100B includes a programmer system 102B that transmits a digital video stream to content distribution system 150B through transmission network 140. Both programmer system 102B and content distribution system 150B may also include similar components as those of programmer system 102A and content distribution system 150A, as described above in FIG. 1A. However, as shown in system 100B, DPI monitors 120B-C (e.g., DPI monitor 120A of FIG. 1A) can be configured to monitor digital video streams generated at other locations of system 100B. In some embodiments, DPI monitors 120B-C may each correspond to DPI monitor 120A, include similar components, and perform similar functionality.

In some embodiments, as shown in system 100B, DPI monitor 120B can be configured to monitor the digital video streams generated by encoder 108. As described above, the digital video stream generated by encoder 108 may be a video transport stream that includes compressed segmentation messages that conform with SCTE 35. Like DPI monitor 120A, DPI monitor 120B may be configured to detect segmentation messages in the output video transport stream and notify a user (e.g., an operator) of a validity of each detected segmentation message within a graphical display.

In some embodiments, as shown in system 100B, DPI monitor 120C can be configured to monitor the digital video streams output by receiver device 132. As described above, the digital video stream output by receive device 132 may correspond to a video transport stream generated and transmitted by programmer system 120B. In some embodiments, the digital video stream output by receiver device 132 may include compressed segmentation messages that conform with SCTE 35. Like DPI monitor 120A, DPI monitor 120C may be configured to detect segmentation messages in the output video transport stream and notify a user (e.g., an operator) of a validity of each detected segmentation message within a graphical display.

Figure 2:
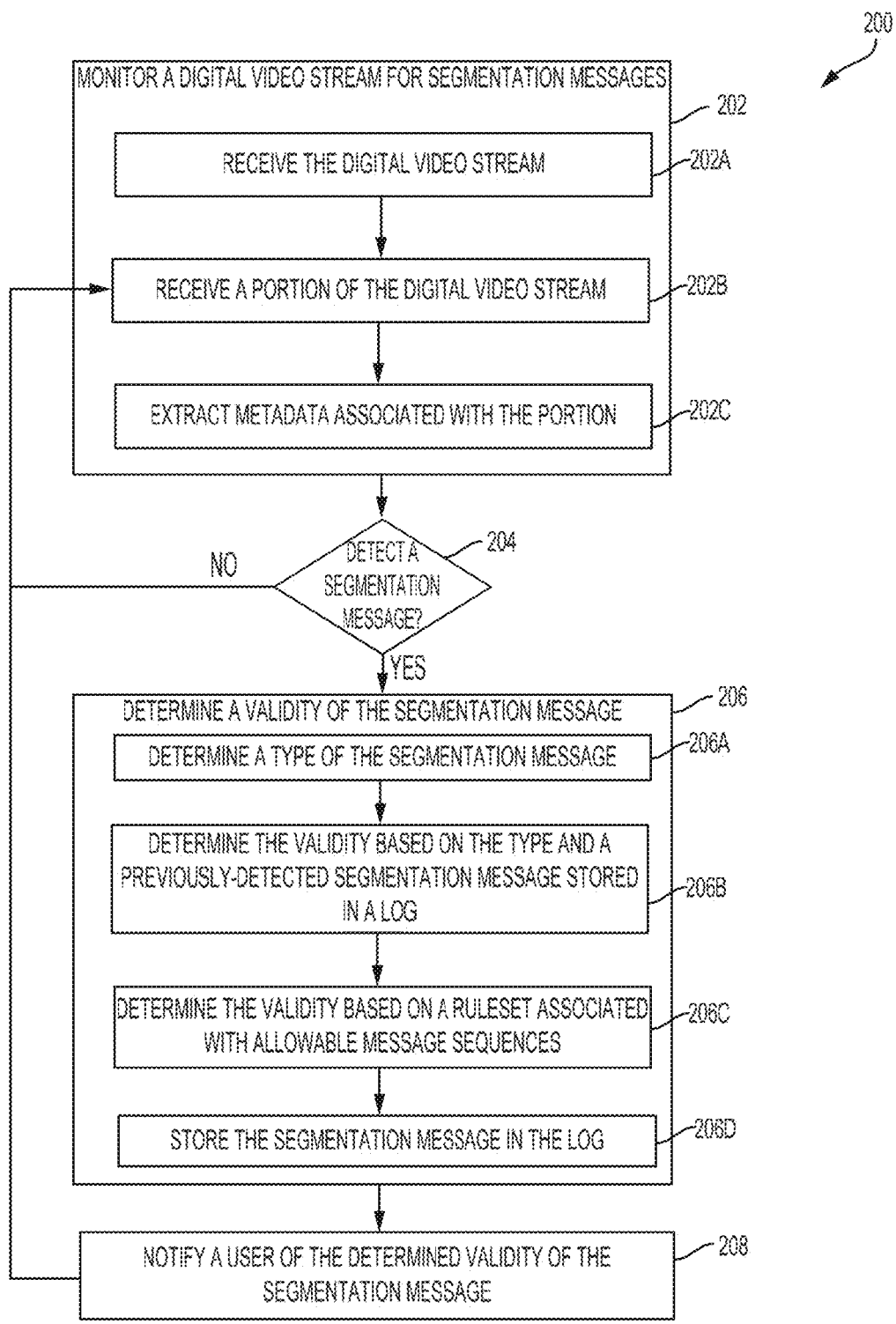
FIG. 2 illustrates a method for monitoring segmentation messages of a digital video stream, according to some embodiments.

FIG. 2 illustrates a method 200 for monitoring segmentation messages of a digital video stream, according to some embodiments. Method 200 can be performed by a monitoring device such as digital program insertion (DPI) monitors 120A-C, as described above with respect to FIGS. 1A-B. Accordingly, one or more of steps 202-208 below may reference the components of, for example, DPI monitor 120A. Method 200 can be a computer-implemented method performed by a computing system with one or more processors and a memory (e.g., the computing system 500 illustrated in FIG. 5). Method 200 may be included in one or more programs stored in memory that, when executed by the one or more processors, cause the one or more processors to perform method 200.

In step 202, the monitoring device monitors a digital video stream for segmentation messages. In some embodiments, the digital video stream includes a plurality of segments of content such as programming content or advertisement content. In some embodiments, each segmentation message can be configured to specify a type of a segment within the video stream as well as to delimit the type of the segment. For example, a segmentation message may indicate a start time or an end time of a segment of advertisement content. In some embodiments, the segmentation messages conform to the SCTE-104 standard. In some embodiments, the segmentation messages conform to the SCTE-35 standard.

In some embodiments, the digital video stream can be generated by a digital program insertion (DPI) message inserter (e.g., inserter 110 of FIG. 1) configured to insert the segmentation messages into the digital video stream. In these embodiments, the monitoring device can be configured to receive and analyze the generated digital video stream to ensure that the DPI message inserter inserted the correct segmentation messages in the correct sequence, as well be further described below.

In some embodiments, step 202 includes steps 202A-C. In step 202A, the monitoring device receives the digital video stream. In step 202B, the monitoring device receives a portion of the digital video stream. For example, the portion may be one or more video frames of the digital video stream. In step 202C, the monitoring device extracts metadata associated with the portion. In some embodiments, the monitoring device parses the metadata from the portion. For example, the monitoring device may demux the metadata from a VANC space or a HANC space of one or more video frames in the portion.

In step 204, the monitoring device determines whether a segmentation message is detected in the digital video stream. In some embodiments, the monitoring device can detect the segmentation message from the extracted metadata associated with a received portion of the digital video stream. If no segmentation message is detected, method 200 returns to step 202, in which the monitoring device continues to monitor the digital video stream for segmentation messages. For example, method 200 may return to step 202B, in which the monitoring device receives a next portion of the digital video stream to be analyzed.

In step 206, the monitoring device determines a validity of the segmentation message. In some embodiments, step 206 includes steps 206A-D.

In step 206A, the monitoring device determines a type of the segmentation message. For example, the monitoring device may match a type ID of the segmentation message against one or more type IDs in a table of segmentation types to determine the type.

In step 206B, the monitoring device determines the validity of the segmentation message based on the type and a previously-detected segmentation message stored in a log. For example, the log may be a cached log of detected segmentation messages stored in DPI storage (e.g., DPI storage 124). In some embodiments, the previously-detected segmentation message corresponds to the most recently detected segmentation message stored in the log.

In step 206C, the monitoring device determines the validity based on a ruleset associated with allowable message sequences. In some embodiments, the monitoring device retrieves permitted segmentation message types based on a previously-detected segmentation message. For example, the monitoring device may access a ruleset database (e.g., ruleset database 122) to retrieve the permitted segmentation message types associated with a type of the previously-detected segmentation message. Then, the monitoring device may determine that the detected segmentation message is valid if a type of the segmentation message matches one of the permitted segmentation message types. Otherwise, the monitoring device may determine that the detected segmentation message is invalid.

In some embodiments, the monitoring device can be configured to generate a segmentation message based on the ruleset and the detected segmentation message. In some embodiments, the generated segmentation message can correspond to an expected, correct segmentation message type. In some embodiments, when the detected segmentation message corresponds to a start type, the monitoring device can be configured to generate the segmentation message of an end type to complement the start type. For example, if the detected segmentation message has a segmentation message type of "BREAK_START," then the generated segmentation message will have a segmentation message type of "BREAK_END."

In step 206D, the monitoring device stores the segmentation message in the log. By storing the detected segmentation message in the log, the monitoring device may maintain a historical sequence of detected segmentation messages of the received digital video stream of step 202. In some embodiments, the log may be stored in memory such as DPI storage 124. In some embodiments, the monitoring device publishes the segmentation message to the top of a persistent cache corresponding to the log. In these embodiments, the top of the persistent cache represents the most recently detected segmentation message. In some embodiments, the memory may store a plurality of logs associated with a plurality of corresponding video streams.

In step 208, the monitoring device notifies a user of the determined validity of the segmentation message. For example, the monitoring device may display a notification on a display of the monitoring device operated by the user. In some embodiments, the monitoring device displays information of the digital video stream based on metadata extracted from the segmentation message. For example, the metadata of the digital video stream may include a current chapter of a programming content being played, a name of the programming content, an amount of time remaining for a chapter, an amount of time remaining during break, etc.

In some embodiments, method 200 proceeds back to step 202, in which the monitoring device continues to monitor the digital video stream for segmentation messages.

In some embodiments, to enable the user to more effectively monitor validity of segmentation messages, the monitoring device can include a GUI configured to display a graphical representation of the digital video stream and to display one or more graphical objects corresponding to one or more detected segmentation messages. In some embodiments, monitoring device can notify the user of the validity by adding or changing a graphical object corresponding to the detected segmentation message to the graphical representation. For example, the monitoring device may color the graphical object to green, red, or gray to correspond to valid, invalid, or not-yet-detected, respectively.

In some embodiments, the monitoring device can be configured to generate one or more predicted segmentation messages based on the detected segmentation messages. For example, the monitoring device may generate the one or more predicted segmentation messages based on a user configuration stored in a ruleset database (e.g., ruleset database 122). In some embodiments, the monitoring device can be configured to display the one or more predicted segmentation messages as corresponding graphical objects on the graphical representation.

In some embodiments, if the detected segmentation message is determined to be invalid with respect to the previously-detected segmentation message, the monitoring device can be configured to display a segmentation message generated based on the previously-detected segmentation message. In some embodiments, if the detected segmentation message is determined to be invalid with respect to the previously-detected segmentation message, the monitoring device can be configured to automatically actuate the segmentation message generated based on the previously-detected segmentation message.

In some embodiments, the monitoring device displays the generated segmentation message to the user in a GUI. The GUI may enable the user to edit portions of the generated segmentation message. In some embodiments, the GUI enables the user to actuate the generated segmentation message. For example, upon receiving the user's request to actuate the generated segmentation message, the monitoring device can be configured to embed the generated segmentation message within the digital video stream. For example, the monitoring device may request an inserter (e.g., inserter 110) to add a SCTE-104 segmentation message to the digital video stream. In another example, the monitoring device may request an encoder (e.g., encoder 108) to add a SCTE-35 segmentation message to the digital video stream.

Figure 3:
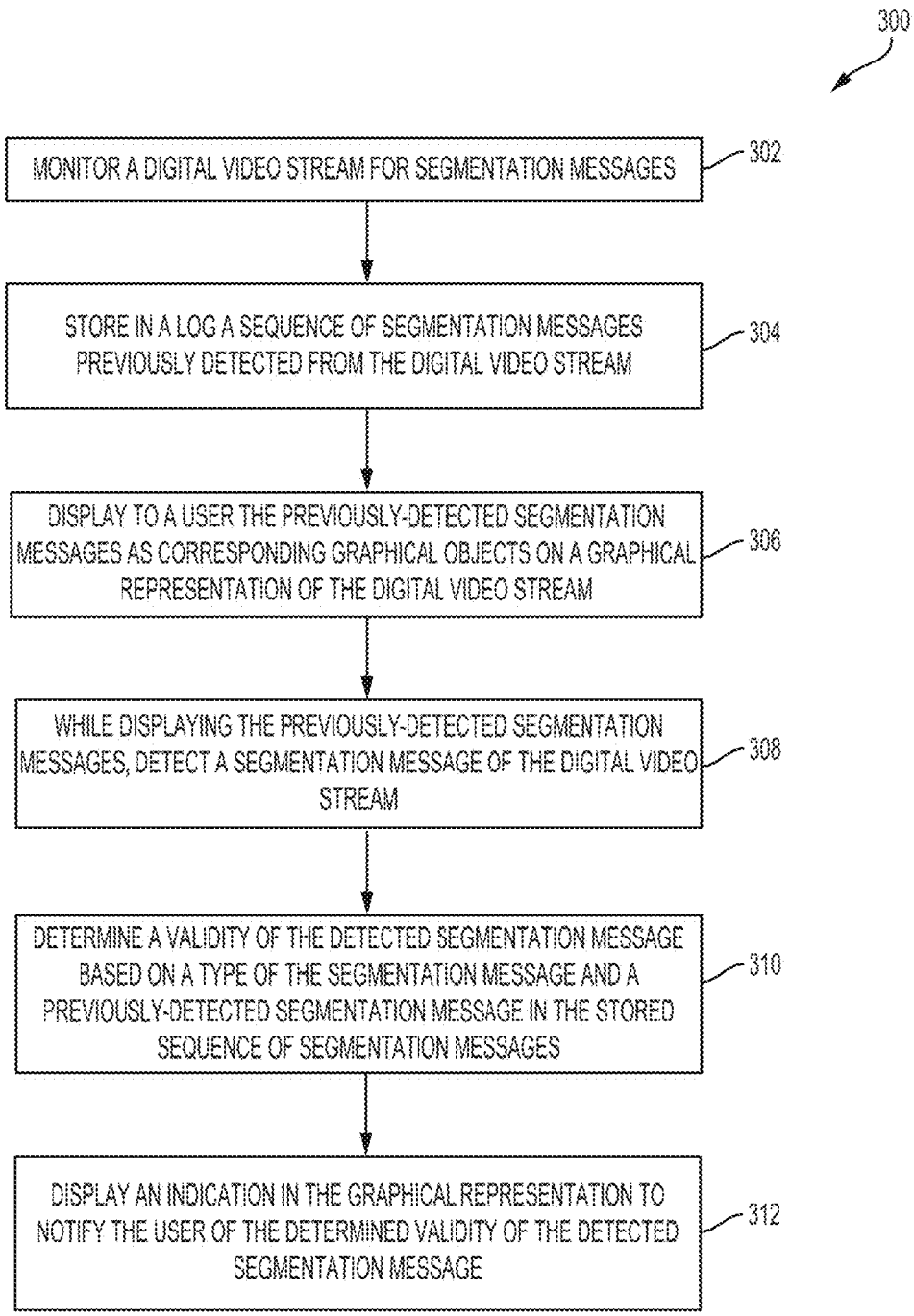
FIG. 3 illustrates a method for monitoring segmentation messages of a digital video stream, according to some embodiments.

FIG. 3 illustrates a method 300 for monitoring segmentation messages of a digital video stream, according to some embodiments. Method 300 can be performed by a monitoring device such as digital program insertion (DPI) monitors 120A-C, as described above with respect to FIGS. 1A-B. Accordingly, one or more of steps 302-312 below may reference the components of, for example, DPI monitor 120A. Method 300 can be a computer-implemented method performed by a computing system with one or more processors and a memory (e.g., the computing system 500 illustrated in FIG. 5). Method 300 may be included in one or more programs stored in memory that, when executed by the one or more processors, cause the one or more processors to perform method 300.

In step 302, the monitoring device monitors a digital video stream for segmentation messages. In some embodiments, step 302 can correspond to step 202 of FIG. 2.

In step 304, the monitoring device stores in a log a sequence of segmentation messages previously detected from the digital video stream. In some embodiments, the log can be stored in a persistent cache (e.g., DPI storage 124 of FIG. 1A). In some embodiments, the monitoring device detects the segmentation messages from the digital video stream in real time as the digital video stream is being monitored. For example, the monitoring device may extract a segmentation message from a VANC space of the video stream. In some embodiment, upon extracting the segmentation message, the monitoring device can be configured to add the segmentation message to the log for storage.

In step 306, the monitoring device displays to a user the previously-detected segmentation messages as corresponding graphical objects on a graphical representation of the digital video stream. In some embodiments, the graphical representation can be a circle graphic whose circumference represents the duration of the programming content. In some embodiments, the graphical representation can be configured as a horizontal bar. In some embodiments, a graphical object corresponding to a previously-detected segmentation message may be a marker object positioned on the graphical representation at a location to indicate the presence of the segmentation message in relation to the duration of the programming content. Accordingly, the location of a graphical object corresponding to a segmentation message may graphically indicate an order of the segmentation message with respect to other segmentation messages of the digital video stream.

In step 308, while displaying the previously-detected segmentation messages, the monitoring device detects a segmentation message of the digital video stream. As discussed above, the monitoring device may continuously receive one or more portions of the digital video stream during monitoring of the digital video stream. For example, a portion may be a frame of the digital video stream. In some embodiment, as the digital video stream is received, the monitoring device can be configured to parse the portion to extract any detected segmentation messages.

In step 310, the monitoring device determines a validity of the detected segmentation message based on a type of the segmentation message and a previously-detected segmentation message in the stored sequence of segmentation messages. In some embodiments, step 310 can correspond to step 206 of FIG. 2. In some embodiments, the monitoring device determines the validity of the detected segmentation message based on the type of the segmentation message and the stored sequence of segmentation messages.

In step 312, the monitoring device displays an indication in the graphical representation of the video stream to notify the user of the determined validity of the detected segmentation message. In some embodiments, the indication is configured to be displayed in relation to a displayed graphical object on the graphical representation and corresponding to the detected segmentation message. For example, the indication may be a color (e.g., red) in the displayed graphical object or a flashing graphic. In some embodiments, the monitoring device displays the indication by displaying an alarm in a pop-up window such as a full-screen alarm.

In some embodiments, the monitoring device is configured to determine predicted segmentation messages based on a ruleset associated with the type of determined for the detected segmentation message. For example, for a segmentation message of a start type, a predicted segmentation message may be a corresponding segmentation message of an end type. In some embodiments, upon determining the predicted segmentation messages, the GUI of the monitoring device can be configured to prepopulate the predicted segmentation message as corresponding graphical objects on the graphical representation before such segmentation messages have been received. In some embodiments, by providing display of these predicted segmentation messages, the GUI can enable the user to better anticipate received segmentation messages.

FIGS. 4A-E illustrate diagrams showing example graphical user interfaces (GUIs) 400A-E for monitoring segmentation messages of a digital video stream, according to some embodiments. As shown in FIGS. 4A-E, GUIs 400A-E can be configured to display respective circular graphics 402A-E, respective radial elements 404A-E, and example graphical objects 406-428. In some embodiments, GUIs 400A-E can be provided by a DPI monitor such as DPI monitor 120A, described above with respect to programmer system 102A of FIG. 1A. For example, GUIs 400A-E may be generated by a GUI component such as GUI 130 of DPI monitor 120A of FIG. 1A. For ease of explanation, the following descriptions of GUIs 400A-E may reference the components of DPI monitor 120A. Additionally, while GUIs 400A-E described below may describe providing visual indicators, other types of indicators (e.g., an audio or haptic indication) may be provided, as described above with respect to FIGS. 2-3.

Figure 4A:
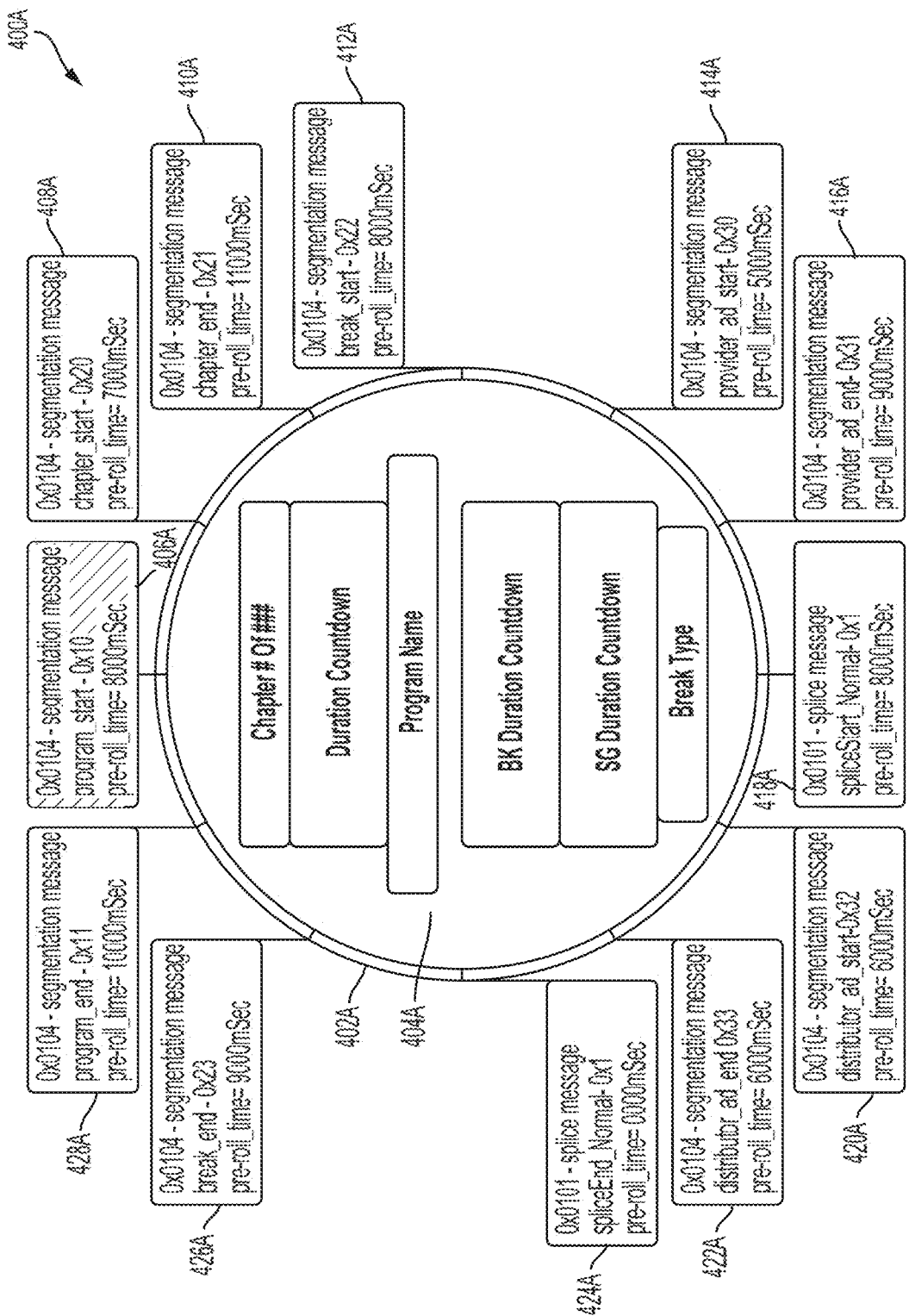
FIGS. 4A-E illustrates example diagrams showing graphical user interfaces for monitoring segmentation messages of a digital video stream, according to some embodiments.

FIG. 4A illustrates a GUI 400A provided by the DPI monitor on a display to a user such as an operator monitoring segmentation messages of the digital video stream. As shown in FIG. 4A, GUI 400A may be configured to display a circular graphic 402A that corresponds to the digital video stream. In some embodiments, circular graphic 402A can represent duration of a content program in the digital video stream. In some embodiments, GUI 400A displays radial elements 404A based on data or metadata determined from one or more detected segmentation messages of the digital video stream. For example, radial elements 404A may include a chapter indicator, a duration countdown, a program name, a break duration countdown, a segment duration countdown, or a break type. In some embodiments, radial elements 404A can be populated by GUI 400A to provide to the user an indication of a message sequence such as a currently detected segmentation message.

In some embodiments, GUI 400A can display graphical objects 406A-428A that correspond to segmentation messages associated with the digital video stream. As discussed above with respect to FIGS. 2-3, graphical objects 406A-428A may correspond to a detected segmentation message or a predicated segmentation message. In some embodiments, a determined validity of a detected graphical object can also be displayed with respect to a corresponding graphical object. For example, upon detecting and processing a segmentation message (e.g., ID 0x0104) of a program-start type (e.g., a segmentation message type ID of 0x10), GUI 400A may be configured to display graphical object 406A in a first color (e.g., green) to indicate that the detected program-start segmentation message is valid. In some embodiments, upon detecting the segmentation message, GUI 400A can be configured to display one or more predicted segmentation messages. For example, based on the program-start segmentation message, DPI monitor 120A may determine that a program-end segmentation message (e.g., an example predicted segmentation message) will be received in the future. Accordingly, GUI 400A may populate circular graphic 402A not only with graphical object 406A corresponding to the detected segmentation message, but also with graphical object 428A corresponding to a predicted segmentation message.

In some embodiments, GUI 400A can display graphical objects 406A-428A at corresponding locations with respect to circular graphic 402A to represent a sequence of graphical objects 406A-428A. For example, graphical object 406A may be associated with an indication (e.g., a marker) shown in circular graphic 402A at the 1 o'clock position. In some embodiments, the sequence of segmentation messages can be displayed by GUI 400A as a clockwise progression of graphical objects 406A-428A. Alternatively, the sequence may be shown in other progressions such as a reverse clockwise progression.

In some embodiments, GUI 400A displays ring segments within circular graphic 402A that correspond to sequential pairs of graphical objects 406A-428A. In some embodiments, GUI 400A can be configured to indicate detected segmentation messages as well as a validity of the detected segmentation message based on the displayed graphical objects 406A-428A or corresponding displayed ring segments, as will be further described below with respect to FIGS. 4B-E.

In some embodiments, ring segments between adjacent start and end segmentation messages of a common segmentation type can form linear graphical progress meters. In some embodiments, a percentage of the progress meters can be determined by DPI monitor 120A based on a current time, a timestamp of the start segmentation message, and a duration metadata included in the segmentation message. For example, DPI monitor 120A may compare the current time against the sum of the timestamp and the duration.

Figure 4B:
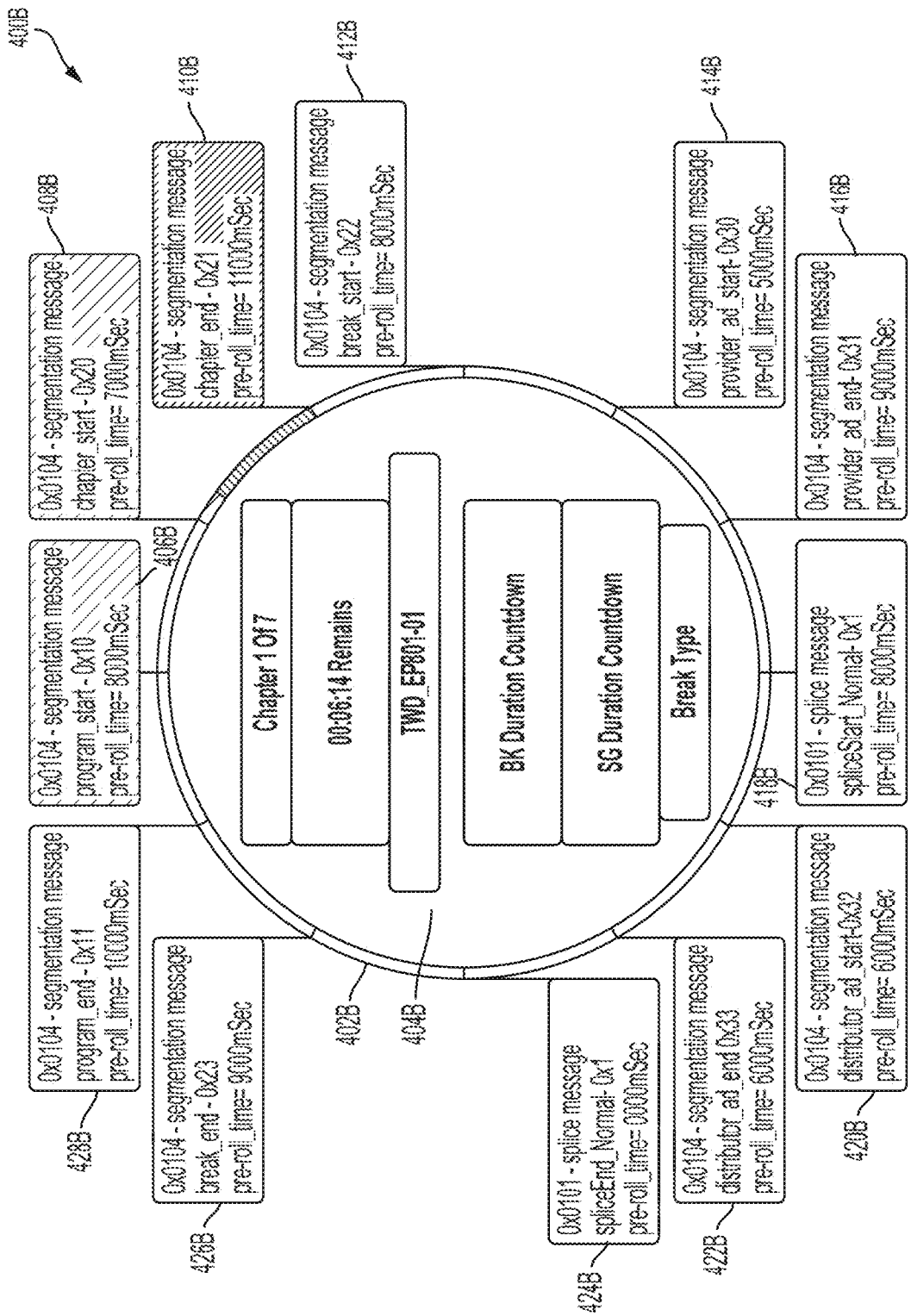

FIG. 4B illustrates a GUI 400B that shows segmentation messages corresponding to graphical objects 406B (i.e., a program start segmentation message) and 408B (i.e., a chapter-start segmentation message) have been previously detected and validated. For example, GUI 400B may assign the first color (e.g., green) to graphical objects 406B and 408B to indicate detection and validity. In some embodiments, GUI 400B can be configured to visually indicate graphical object 410B as the next expected segmentation message with respect to the charter-start segmentation message represented by graphical object 408B. For example, GUI 400B may assign graphical object 410B to a second color (e.g., yellow). In some embodiments, the chapter-end segmentation message corresponding to graphical object 410B may be a predicted segmentation message determined by DPI monitor 120A based on one or more previously-detected segmentation messages such as the chapter-start segmentation message corresponding to graphical object 408B.

In some embodiments, GUI 400B can be configured to update radial elements 404B based on data or metadata extracted from the previously-detected segmentation messages. For example, based on data extracted from the chapter-start segmentation message associated with graphical object 408B, GUI 400B may configure radial elements 404B to display one or more of a current chapter number (i.e., "Chapter 1 of 7"), a total number of chapters (i.e., "Chapter 1 of 7"), a program name (i.e., "TWD_EP801-01"), or a calculated duration countdown (i.e., "00:06:14 Remains").

In some embodiments, GUI 400B can display a progress bar in the ring segment bounded by graphical objects 408B-410B prior to receiving the chapter-end segmentation message corresponding to graphical object 410B. For example, as shown in FIG. 4B, the segment countdown may be displayed by changing a color of a portion of the ring segment such as in a green-to-gray progress bar.

Figure 4C:
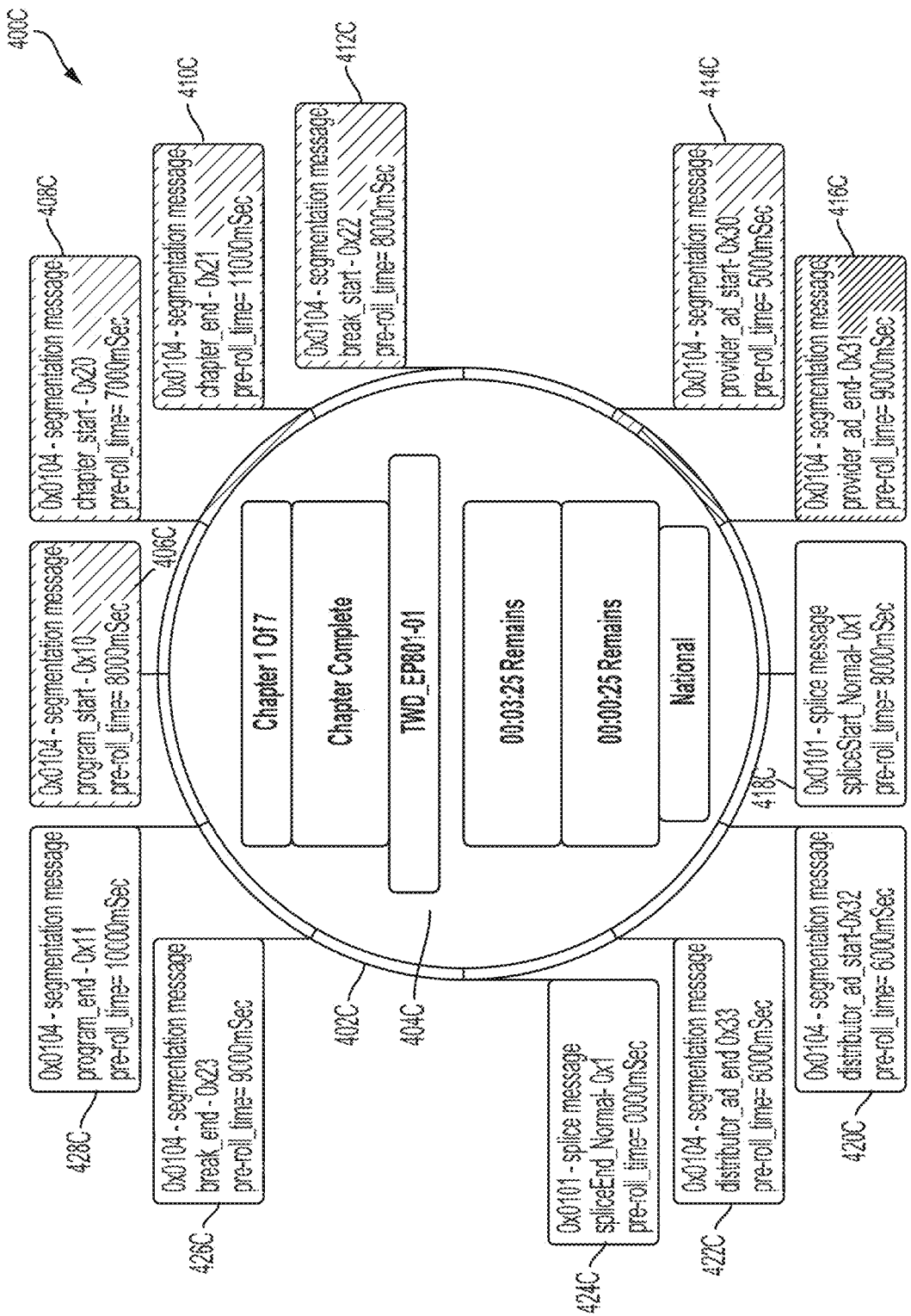

FIG. 4C illustrates a GUI 400C that shows segmentation messages corresponding to graphical objects 406C-414C have been previously detected. For example, GUI 400C may assign the first color (e.g., green) to graphical objects 406C-414C. In some embodiments, GUI 400C can be configured to display the indicator for a detected segmentation message for a predetermined amount of time after the detection or a start/end pair of segmentation messages have been detected. As shown, the ring segment between graphical objects 408C-410C can be assigned the first color (e.g., green) to indicate completion. Additionally, GUI 400C may configured radial elements 404C to indicate a number of completed chapters (e.g., "Chapter 1 of 7" and "Chapter Complete"). In some embodiments, GUI 400C can display the program name (e.g., "TWD_EP801-01") in radial elements 404C until a program-end segmentation message corresponding to graphical object 428C has been detected.

As shown in FIG. 4C, the provider-ad-start segmentation message corresponding to graphical object 414C has been detected and assigned a visual indicator (e.g., the first color) to indicate a determined validity. Based on the data extracted from one or more previously-detected segmentation messages including the provider-ad-start segmentation message, GUI 400C may update radial elements 404C to display a break duration countdown of "00:03:25 Remains," a segment duration countdown of "00:00:25 Remains," and a break type of "National." For example, GUI 400C may determine the break duration countdown based on a current time (e.g., a current timestamp) and data (e.g., a timestamp, a break duration, etc.) in the break-start segmentation message corresponding to graphical object 412C. Similarly, GUI 400C may determine the segment duration based on the current time and data in the provider-ad-start segmentation message corresponding to graphical object 414C.

As shown in FIG. 4C, GUI 400C may assign the second color (e.g., yellow) to graphical object 416C corresponding to a provider-ad-end segmentation message, which may be a predicted segmentation message. As described above, upon detecting the provider-ad-end segmentation message as the next segmentation message, GUI 400A may assign the first color or other indicators to graphical object 416C to indicate a valid detected message. If an invalid segmentation message such as a break-end segmentation message is received instead, GUI 400C may display a different indicator with respect to graphical object 416C. For example, GUI 400C may generate an alarm or assign a third color (e.g., red) to graphical object 416C.

Figure 4D:
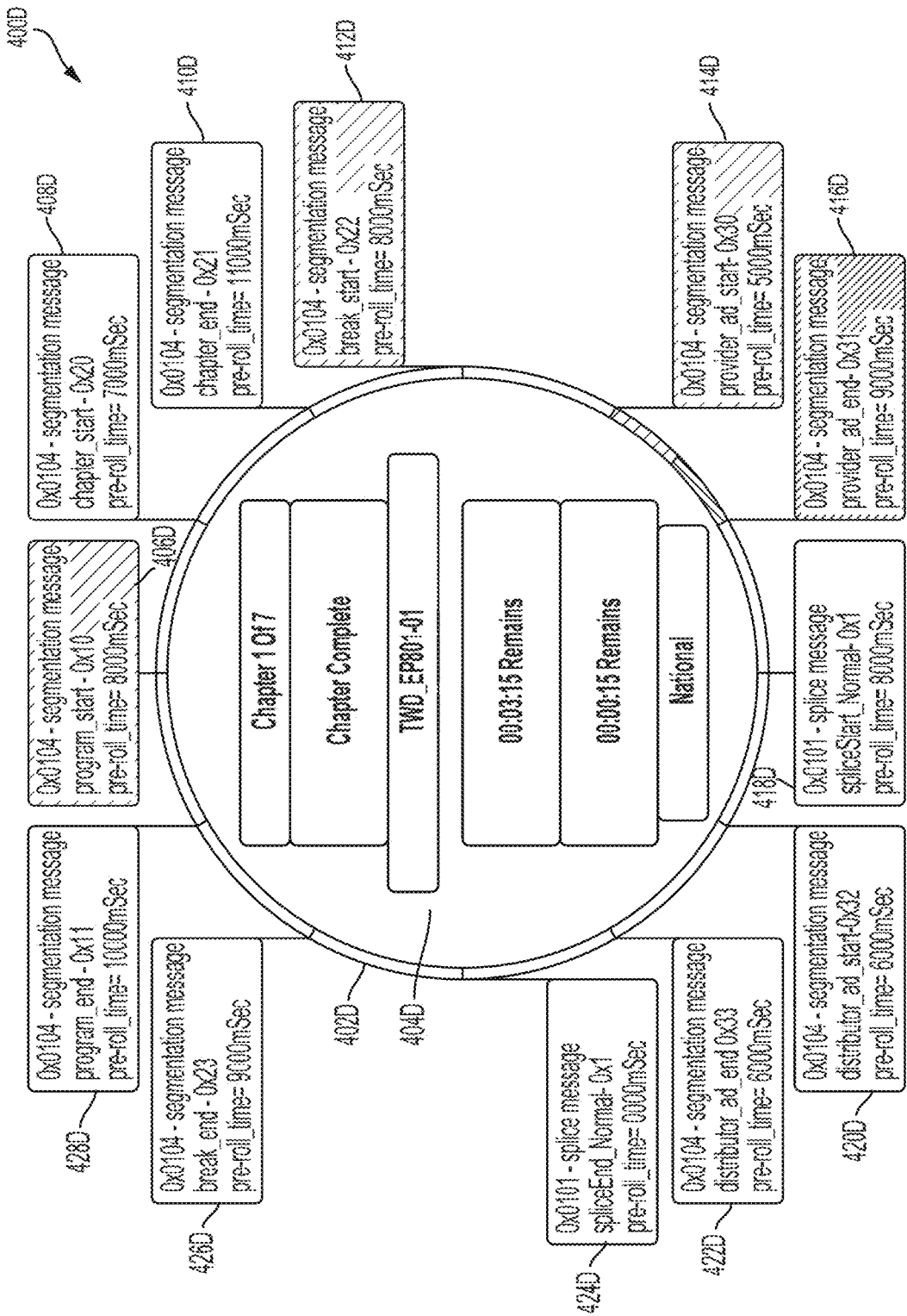

FIG. 4D illustrates a GUI 400D that shows further time (e.g., 10 seconds) has passed since provider-ad-start segmentation message corresponding to graphical object 414C has been received. In particular, the ring segment bounded by graphical objects 414D and 416D indicates more progression as compared to the ring segment bounded by graphical objects 414C and 416C as displayed by GUI 400C in FIG. 4C. In addition, GUI 400D may be configured to update radial elements 404D to display, for example, that "00:03:15 Remains" in the break duration countdown and that "00:00:15 Remains" in the segment duration countdown as compared to the "00:03:25 Remains" in the break duration countdown and that "00:00:25 Remains" in the segment duration countdown as shown in ring elements 404C of FIG. 4C.

In some embodiments, the visual indication for corresponding pairs of start and end segmentation messages of the same type can be configured to be displayed for a predetermined amount of time after detection. For example, after this predetermined time has elapsed, GUI 400D may display graphical objects 408D and 410D corresponding to a chapter-start segmentation message and a chapter-end segmentation message in their default configuration. For example, GUI 400D may clear the first color (e.g., green) previously assigned to graphical objects 408D and 410D.

Figure 4E:
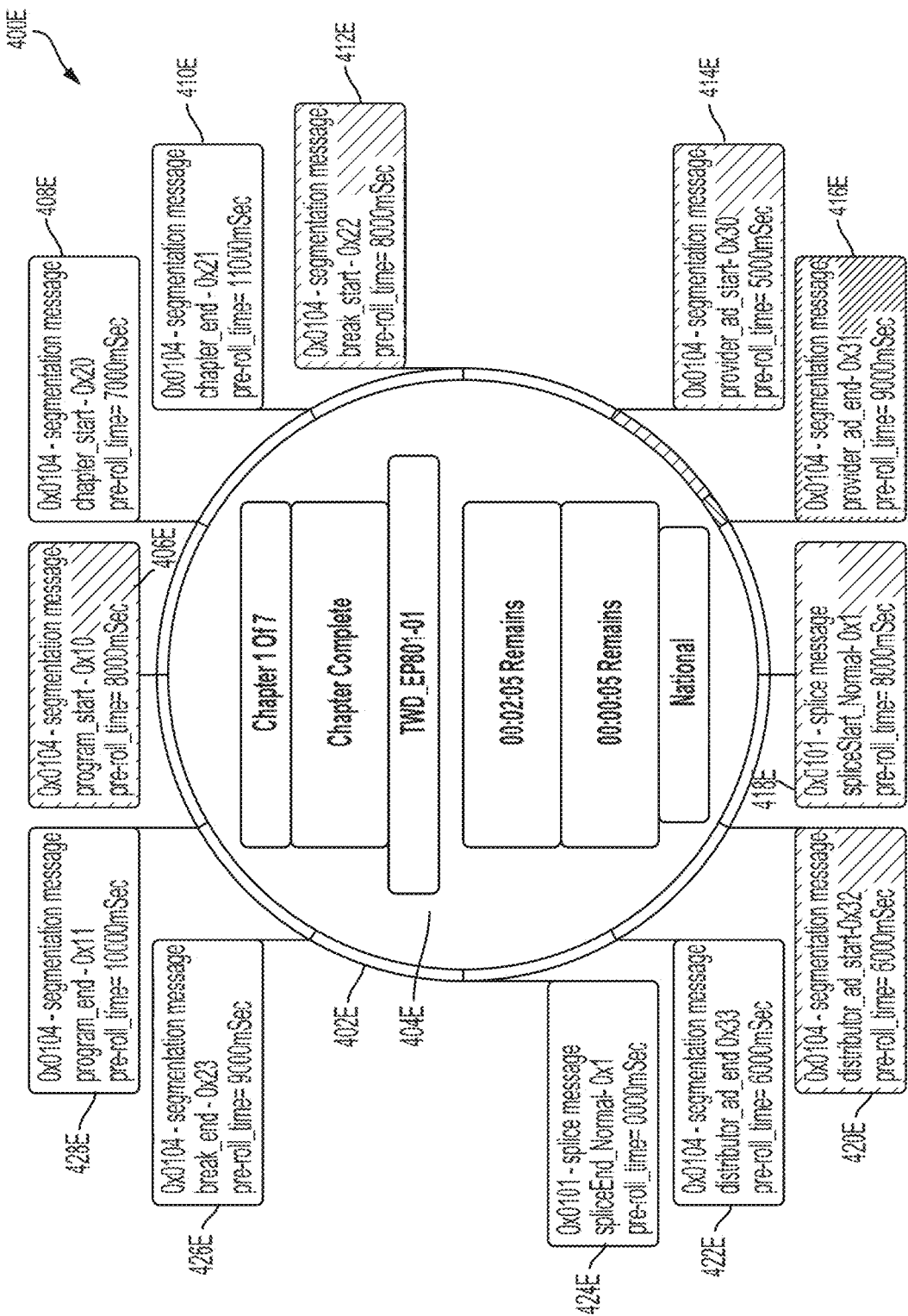

FIG. 4E illustrates a GUI 400E that shows that the splice-start-normal segmentation message and the distributor-ad-start segmentation message corresponding to graphical objects 418E and 420E, respectively, have been detected since the state of the digital video stream as detected and shown by GUI 400D of FIG. 4D. For example, GUI 400E may assign the first color (e.g. green) to graphical objects 418E and 420E. In some embodiments, GUI 400E can be configured to maintain the state (e.g., the second color) of graphical object 416E because it is the next expected segmentation message to be received, but has not yet been detected. In some embodiments, GUI 400E may be configured to maintain a status of graphical object 422E corresponding to a distributor-ad-end segmentation message and expected to follow the detected distributor-ad-start segmentation message because the expected provider-ad-end segmentation message of graphical object 416E has not yet been detected.

As described above, GUI 400E may be configured to provide an indication that a detected segmentation message is invalid. For example, if the next detected segmentation message is a distributor-ad-end segmentation message, GUI 400E may be configured to assign the third color (e.g., red) to graphical object 416E to indicate to the user that the provider-ad-end segmentation message was omitted. In some embodiments, GUI 400E can enable the user to generate the provider-ad-end segmentation message for insertion into the digital video stream based on graphical object 416E. In another example, GUI 400E may be configured to assign the third color (e.g., red) to graphical object 422E to indicate to the user that the detected distributor-ad-end segmentation message is received out of sequence. In this example, GUI 400E may enable the user to generate the provider-ad-end segmentation message for insertion into the digital video stream based on graphical object 416E.

Figure 5:
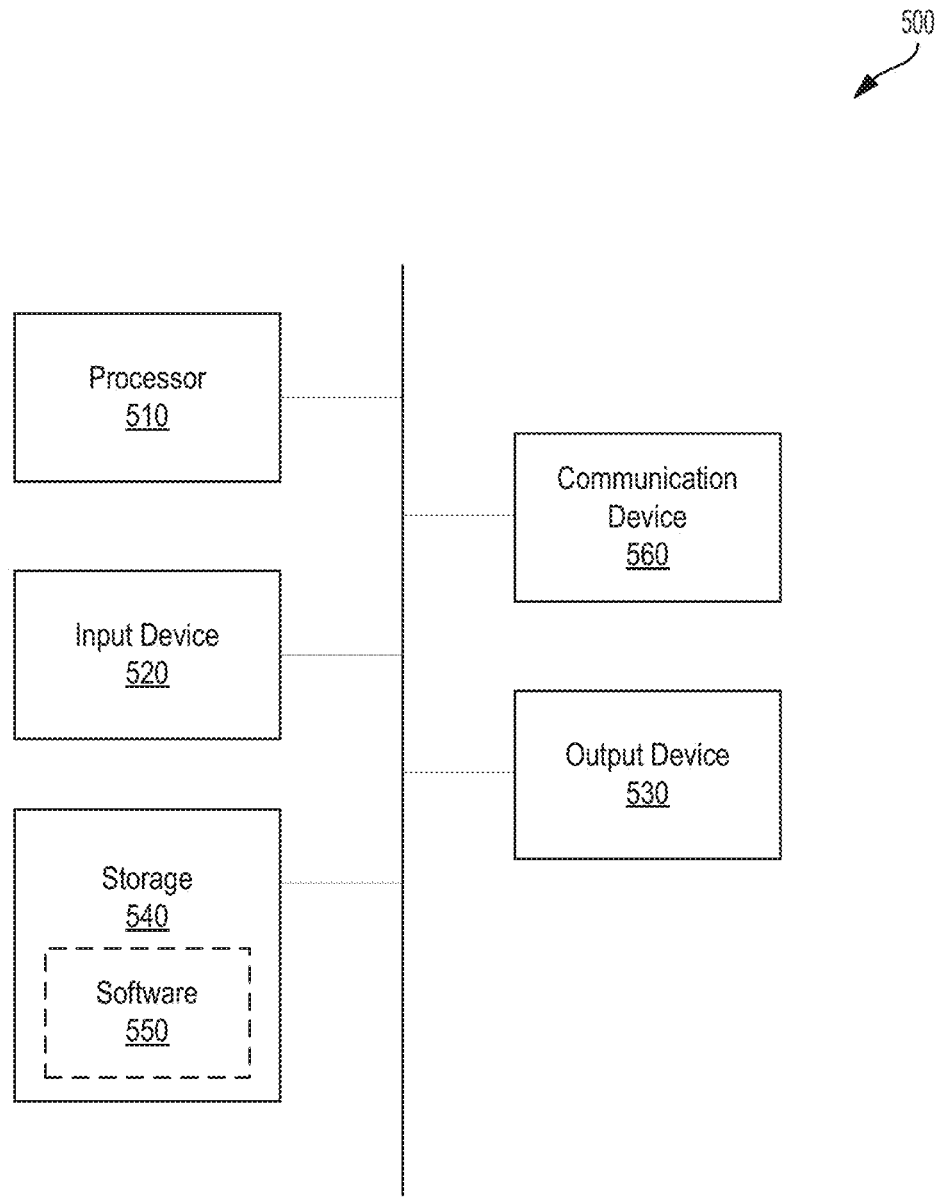
FIG. 5 illustrates an example of a computing device, according to some embodiments.

FIG. 5 illustrates an example of a computing device, according to some embodiments. Computing device 500 can be a component of a system for monitoring segmentation messages of a digital video stream according to the systems and methods described above, such as systems 100A-B of FIGS. 1-2, or can include the entire system itself. In some embodiments, computing device 500 is configured to execute a method for monitoring segmentation messages of the digital video stream, such as methods 200 and 300 of FIGS. 2 and 3, respectively.

Computing device 500 can be a host computer connected to a network. Computing device 500 can be a client computer or a server. As shown in FIG. 5, computing device 500 can be any suitable type of microprocessor-based device, such as a personal computer, workstation, server, or handheld computing device, such as a phone or tablet. The computer can include, for example, one or more of processor 510, input device 520, output device 530, storage 540, and communication device 560. Input device 520 and output device 530 can correspond to those described above and can either be connectable or integrated with the computer.

Input device 520 can be any suitable device that provides input, such as a touch screen or monitor, keyboard, mouse, or voice-recognition device. Output device 530 can be any suitable device that provides an output, such as a touch screen, monitor, printer, disk drive, or speaker.

Storage 540 can be any suitable device that provides storage, such as an electrical, magnetic, or optical memory, including a random access memory (RAM), cache, hard drive, CD-ROM drive, tape drive, or removable storage disk. Communication device 560 can include any suitable device capable of transmitting and receiving signals over a network, such as a network interface chip or card. The components of the computer can be connected in any suitable manner, such as via a physical bus or wirelessly. Storage 540 can be a non-transitory computer-readable storage medium comprising one or more programs, which, when executed by one or more processors, such as processor 510, cause the one or more processors to execute methods described herein, such as methods 200 and 300 of FIGS. 2 and 3, respectively.

Software 550, which can be stored in storage 540 and executed by processor 510, can include, for example, the programming that embodies the functionality of the present disclosure (e.g., as embodied in the systems, computers, servers, and/or devices as described above). In some embodiments, software 550 can include a combination of servers such as application servers and database servers.

Software 550 can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 540, that can contain or store programming for use by or in connection with an instruction execution system, apparatus, or device.

Software 550 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include but is not limited to, an electronic, magnetic, optical, electromagnetic, or infrared wired or wireless propagation medium.

Computing device 500 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computing device 500 can implement any operating system suitable for operating on the network. Software 550 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The preceding description sets forth exemplary methods, parameters and the like. It should be recognized, however, that such description is not intended as a limitation on the scope of the present disclosure but is instead provided as a description of exemplary embodiments. The illustrative embodiments described above are not meant to be exhaustive or to limit the disclosure to the precise forms disclosed. Many modifications and variations are possible in view of the above teachings. The embodiments were chosen and described to best explain the principles of the disclosed techniques and their practical applications. Others skilled in the art are thereby enabled to best utilize the techniques, and various embodiments with various modifications as are suited to the particular use contemplated.

Although the disclosure and examples have been thoroughly described with reference to the accompanying figures, it is to be noted that various changes and modifications will become apparent to those skilled in the art. Such changes and modifications are to be understood as being included within the scope of the disclosure and examples as defined by the claims. In the preceding description of the disclosure and embodiments, reference is made to the accompanying drawings, in which are shown, by way of illustration, specific embodiments that can be practiced. It is to be understood that other embodiments and examples can be practiced, and changes can be made without departing from the scope of the present disclosure.

Although the preceding description uses terms first, second, etc. to describe various elements, these elements should not be limited by the terms. These terms are only used to distinguish one element from another.

Also, it is also to be understood that the singular forms "a," "an," and "the" used in the preceding description are intended to include the plural forms as well unless the context indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

In some embodiments, a non-transitory computer-readable storage medium stores one or more programs configured to be executed by one or more processors of an electronic device, the one or more programs including instructions for implementing any of the steps described or claimed herein. The present disclosure also relates to a device for performing the operations herein. This device may be specially constructed for the required purposes, or it may include a general-purpose computer selectively activated or reconfigured by a computer program stored in the computer. Such a computer program may be stored in a non-transitory, computer computer-readable storage medium, such as, but not limited to, any type of disk, including floppy disks, optical disks, CD-ROMs, magnetic-optical disks, read-only memories (ROMs), random access memories (RAMs), electrically program read-only memories (EPROMs), electronically erasable program read-only memories EEPROMs, magnetic or optical cards, application specific integrated circuits (ASICs), or any type of media suitable for storing electronic instructions, and each coupled to a computer system bus. Furthermore, the computers referenced in this disclosure may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems appears from the description above. Also, the present disclosure is not described with reference to any particular programming language. It will be appreciated that a variety of programming languages may be used to implement the teachings of the present disclosure as described herein.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

What is claimed is:

1. A method for monitoring and visualizing segmentation messages of a digital video stream, comprising:
   at an electronic device comprising one or more processors and a display:
      monitoring a digital video stream comprising segmentation messages;
      detecting a segmentation message of the digital video stream;
      determining a validity status of the segmentation message; and
      displaying a graphical representation of the digital video stream;
      displaying a graphical representation of the segmentation message, wherein:
         a position of the graphical representation of the segmentation message with respect to the graphical representation of the digital video stream indicates a temporal position of the segmentation message in a sequence of segmentation messages; and
         a visual characteristic of the graphical representation of the segmentation message indicates the determined validity status of the segmentation message.

2. The method of claim 1, wherein determining the validity status of the segmentation message is based on the sequence of segmentation messages.

3. The method of claim 2, further comprising, at the electronic device, before detecting the segmentation message, detecting the sequence of segmentation messages in the digital video stream.

4. The method of claim 1, wherein the graphical representation of the digital video stream comprises a ring diagram representing a chronological progression of the digital video stream.

5. The method of claim 4, further comprising, at the electronic device:
   extracting information regarding the digital video stream from the segmentation message; and
   displaying the information regarding the digital video stream in a central portion of the ring diagram.

6. The method of claim 1, wherein the graphical representation of the segmentation message is displayed adjacent to the graphical representation of the digital video stream.

7. The method of claim 1, further comprising, at the electronic device, displaying a visual indicator, overlaid on the graphical representation of the digital video stream, that corresponds to the graphical representation of the segmentation message.

8. The method of claim 1, wherein displaying the graphical representation of the digital video stream comprises displaying a visual representation of a stream segment bounded on one end by the segmentation message.

9. The method of claim 8, wherein the visual representation of the stream segment comprises a progress meter for which a progress percentage is determined based on a timestamp of the segmentation message.

10. The method of claim 1, wherein the visual characteristic of the graphical representation of the segmentation message comprises one or more of: a color of the graphical representation of the segmentation message, and text included in the graphical representation of the segmentation message.

11. The method of claim 1, further comprising, at the electronic device:
   determining a predicted segmentation message based the segmentation message;
   displaying a graphical representation of the predicted segmentation message, wherein:
      a position of the graphical representation of the predicted segmentation message with respect to the graphical representation of the digital video stream indicates a temporal position of the predicted segmentation message in the sequence of detected segmentation messages; and
      a visual characteristic of the graphical representation of the predicted segmentation message indicates that the predicted segmentation message is predicted.

12. The method of claim 1, further comprising, at the electronic device, displaying a plurality of graphical representations corresponding respectively to a plurality of the sequence of segmentation messages.

13. The method of claim 1, further comprising, at the electronic device:
   receiving a user input comprising an instruction to generate a user-generated segmentation message for insertion into the digital video stream; and
   in accordance with the user input, generate the user-generated segmentation message for insertion into the digital video stream.

14. The method of claim 13, further comprising, at the electronic device, requesting an inserter device to insert the user-generated segmentation message into the digital video stream.

15. A system for monitoring and visualizing segmentation messages of a digital video stream, comprising:
   a display, and
   one or more processors configured to cause the system to:
      monitor a digital video stream comprising segmentation messages;
      detect a segmentation message of the digital video stream;
      determine a validity status of the segmentation message; and
      display a graphical representation of the digital video stream;
      display a graphical representation of the segmentation message, wherein:
         a position of the graphical representation of the segmentation message with respect to the graphical representation of the digital video stream indicates a temporal position of the segmentation message in a sequence of segmentation messages; and
         a visual characteristic of the graphical representation of the segmentation message indicates the determined validity status of the segmentation message.

16. A non-transitory computer-readable storage medium storing instructions for monitoring and visualizing segmentation messages of a digital video stream, wherein the instructions, when executed by a system comprising a display and one or more processors, cause the system to:
   monitor a digital video stream comprising segmentation messages;

detect a segmentation message of the digital video stream;
determine a validity status of the segmentation message; and
display a graphical representation of the digital video stream;
display a graphical representation of the segmentation message, wherein:
- a position of the graphical representation of the segmentation message with respect to the graphical representation of the digital video stream indicates a temporal position of the segmentation message in a sequence of segmentation messages; and
- a visual characteristic of the graphical representation of the segmentation message indicates the determined validity status of the segmentation message.

* * * * *